United States Patent
Bao et al.

(10) Patent No.: US 9,471,616 B2
(45) Date of Patent: *Oct. 18, 2016

(54) MANAGING USER RATINGS IN A WEB SERVICES ENVIRONMENT

(71) Applicant: INTERNATIONAL BUSINESS MACHINES CORPORATION, Armonk, NY (US)

(72) Inventors: Zhendong Bao, Marietta, GA (US); William P. Shaouy, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/824,734

(22) Filed: Aug. 12, 2015

(65) Prior Publication Data

US 2015/0347491 A1    Dec. 3, 2015

Related U.S. Application Data

(63) Continuation of application No. 14/086,415, filed on Nov. 21, 2013, now Pat. No. 9,165,075, which is a continuation of application No. 11/846,411, filed on Aug. 28, 2007, now Pat. No. 8,635,222.

(51) Int. Cl.
G06F 17/30 (2006.01)
G06F 7/00 (2006.01)
G06Q 30/02 (2012.01)

(52) U.S. Cl.
CPC ..... *G06F 17/30345* (2013.01); *G06F 17/3089* (2013.01); *G06F 17/30528* (2013.01); *G06F 17/30648* (2013.01); *G06F 17/30864* (2013.01); *G06F 17/30867* (2013.01); *G06F 17/30893* (2013.01); *G06Q 30/0267* (2013.01)

(58) Field of Classification Search
CPC ..................... G06F 17/30864; G06F 17/3053; G06F 17/30345
See application file for complete search history.

(56) References Cited

U.S. PATENT DOCUMENTS

| | | |
|---|---|---|
| 6,311,178 B1 | 10/2001 | Bi et al. |
| 6,898,631 B1 | 5/2005 | Kraft et al. |
| 6,981,040 B1 | 12/2005 | Konig et al. |
| 7,603,350 B1 | 10/2009 | Guha |
| 7,664,669 B1 | 2/2010 | Adams et al. |

(Continued)

OTHER PUBLICATIONS

Balke, W-T et al., "Through Different Eyes-Assessing Multiple Conceptual Views for Querying Web Services", WWW 2004, May 17-22, 2004, New York, NY USA, ACM 1-58113-912-8/04/0005, pp. 196-205.

(Continued)

*Primary Examiner* — Jeffrey A Burke
(74) *Attorney, Agent, or Firm* — John Pivnichny; Andrew M. Calderon; Roberts Mlotkowski Safran, Cole & Calderon, P.C.

(57) ABSTRACT

Systems and methods for managing user ratings in a web services environment. A method includes storing a comment associated with a web service and storing an influence rating associated with an author of the comment. The method also includes transmitting information associated with the web service, the comment, and the influence rating to a user. Additionally, the method includes receiving feedback from the user, and determining an updated influence rating based upon the feedback and the influence rating.

14 Claims, 5 Drawing Sheets

(56) References Cited

U.S. PATENT DOCUMENTS

| | | |
|---|---|---|
| 2002/0143819 A1 | 10/2002 | Han et al. |
| 2002/0198866 A1 | 12/2002 | Kraft et al. |
| 2004/0122926 A1 | 6/2004 | Moore et al. |
| 2005/0165656 A1 | 7/2005 | Frederick et al. |
| 2006/0143158 A1 | 6/2006 | Ruhl et al. |
| 2006/0161524 A1 | 7/2006 | Roy et al. |
| 2006/0282336 A1 | 12/2006 | Huang |
| 2007/0208613 A1 | 9/2007 | Backer |
| 2007/0250611 A1 | 10/2007 | Bhogal et al. |
| 2007/0255753 A1 | 11/2007 | Pomerantz |
| 2007/0282879 A1 | 12/2007 | Degenkolb et al. |

OTHER PUBLICATIONS

Keidl, M. et al., "Towards Context-Aware Adaptable Services", WWW 2004, May 17-22, New York, NY USA, AMC 1-58113-912-8/04/0005, pp. 55-65.

Liu, Ling et al., "Information Monitoring on the Web: A Scalable Solution", WWW, vol. 5, No. 4, 2002, abstract only (pp. 1-4 of Internet print-out).

MANAGING USER RATINGS IN A WEB SERVICES ENVIRONMENT

FIELD OF THE INVENTION

The invention generally relates to a service oriented architecture and, more particularly, to systems and methods for managing user ratings in a web services environment.

BACKGROUND OF THE INVENTION

Service oriented architecture (SOA) is a computing architecture in which services (e.g., web services) are made available for use by applications. Typically, services comprise programming functions (i.e., software components) and applications comprise programs that call the services and receive data results from the called services. In this manner, an author of an application need not write new code to perform functionality if that functionality is already available as a service. Instead, the author may arrange for the application to call the service and receive the results from the service. For example, an application associated with a retail store point of sale terminal may require that a purchaser's credit card information be verified at the time of presentment of the credit card. Instead of including code to perform such a function in the application, the application may call an already existing service that performs the verification and returns the results to the application. The entity that provides the service may charge a fee for performing the service.

A standard protocol (e.g., XML) is typically used for communication amongst applications and services. In this way, services can be offered to applications independent of an individual application platform or programming language. Owing to this generic availability, service repositories currently exist on networks (intranet and Internet) and are available for use by multiple and diverse applications.

A particular implementation of SOA is a web services environment, in which users of services (i.e., service users) and providers of services (i.e., service publishers) are linked by a communication network (e.g., the Internet). One of the biggest challenges in web services environments is for service users to find a service that they need, and, conversely, for service publishers to inform service users of their available services. For example, a service user desiring a particular functionality for an application may have to consider thousands of published services to find an acceptable service for the task at hand. To facilitate the matching of service users and service publishers, industry initiatives, such as the Universal Description, Discovery, and Integration (UDDI) specification, have been developed for publishing and finding metadata about published services.

The UDDI specification is an XML-based registry that allows businesses (i.e., service publishers) to list themselves and their published services on the Internet, and consumers (i.e., service users) to find and execute published services. UDDI currently includes three components (a white pages, yellow pages, and green pages) that contain information about the registered businesses and the web services they offer. For example, the white pages includes identity information, such as a service publisher's name, contact information, etc. Additionally, the yellow pages includes information that organizes published services by industry category. Lastly, the green pages contains technical information (such as URL location, execution instruction, etc.) about published services.

The information contained in a UDDI registry is stored and maintained (for example, in a database) by a UDDI provider. The registry is searchable in known manners by applying search criteria to various combinations of data fields of the white, yellow, and green pages. Depending on the degree of specificity of a search query, a search may return a list of published services for a service user to review. In this manner, a service user may locate and execute services. Moreover, a service publisher may receive payment for the use of published services.

However, all of the information available in the UDDI registry is provided by the service publishers and/or by the UDDI provider. There is no information provided by service users that could help other service users decide which services to use.

Accordingly, there exists a need in the art to overcome the deficiencies and limitations described hereinabove.

SUMMARY OF THE INVENTION

In a first aspect of the invention, a method comprises storing a comment associated with a web service and storing an influence rating associated with an author of the comment. The method also includes transmitting information associated with the web service, the comment, and the influence rating to a user. Additionally, the method includes receiving feedback from the user, and determining an updated influence rating based upon the feedback and the influence rating.

In another aspect of the invention, a method comprises providing a computer infrastructure operable to store information associated with offered web services and at least one comment associated with at least one web service of the offered web services. The computer infrastructure is further operable to store an influence rating of an author of the at least one comment, receive feedback from a user, and update the influence rating based upon the feedback.

In another aspect of the invention, there is a computer program product comprising a computer usable medium having a computer readable program embodied in the medium, wherein the computer readable program when executed on a computing device causes the computing device to: store information associated with a web service; store a comment associated with the web service; and store a rating of an author of the comment. The computer readable program when executed on a computing device further causes the computing device to: transmit the information, the comment, and the rating to a user; receive feedback associated with the comment from the user; and determine an updated rating based upon the feedback and the rating.

In another aspect of the invention, there is a system comprising a server having a first database containing data associated with available web services in a web services environment, a second database containing data associated with web service users, and at least one of a hardware and software component configured to receive a search query from an interface. The at least one of a hardware and software component is further configured to retrieve information associated with a web service that meets the criteria of the search query, retrieve a comment associated with the web service, and retrieve an influence rating of one of the web service users associated with the comment; The at least one of a hardware and software component is further configured to transmit the information, the comment, and the influence rating to the interface.

DETAILED DESCRIPTION OF EMBODIMENTS OF THE INVENTION

The invention generally relates to a service oriented architecture and, more particularly, to a system and method for managing user ratings in a web services environment. Embodiments of the invention are implemented through interaction with a service oriented architecture (SOA) system, such as UDDI. For example, an interface may be provided for web service users to enter comments about particular web services they have used. The interface may further allow other users to provide feedback regarding the perceived value (e.g., helpfulness) of a particular user's comments. Moreover, a user score manager (USM) may be provided to determine a user influence rating for a particular user based upon the feedback that the user's comments receive. The influence rating of a user may be displayed with the user's comments, thereby providing enhanced information for other users to consider when determining whether or not to use a particular web service. In this manner, implementations of the invention are useful for assisting web service users in finding and evaluating web services in an SOA system.

Figure 1:
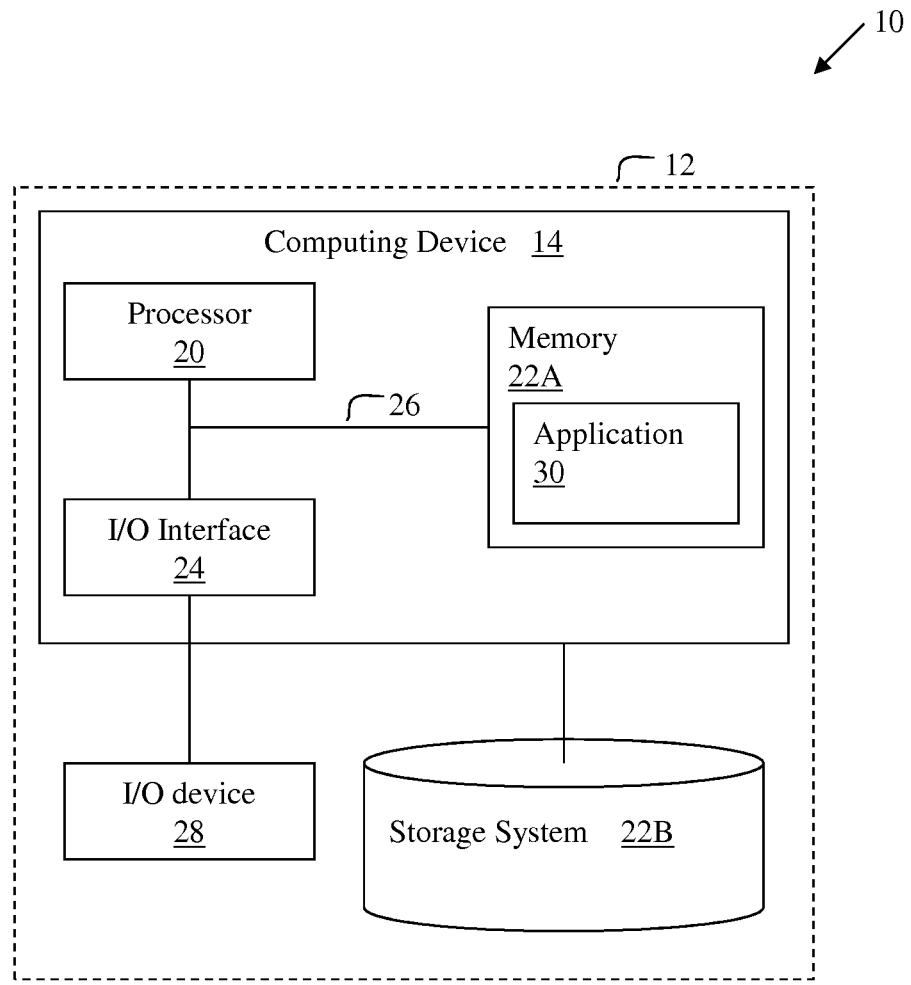
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes the computing device 14 operable to perform the processes described herein, e.g., managing user ratings, etc. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

The processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator or providing entity, could offer to perform the processes described herein, such as, for example, managing user ratings. In this case, the service provider (e.g., providing entity) can create, maintain, deploy, support, etc., a computer infrastructure that performs the process steps of the invention for one or more customers. In return, the service provider (e.g., providing entity) can receive payment from the customer(s) under a subscription and/or fee agreement and/or the service provider can receive payment from the sale of advertising content to one or more third parties.

Figure 2:
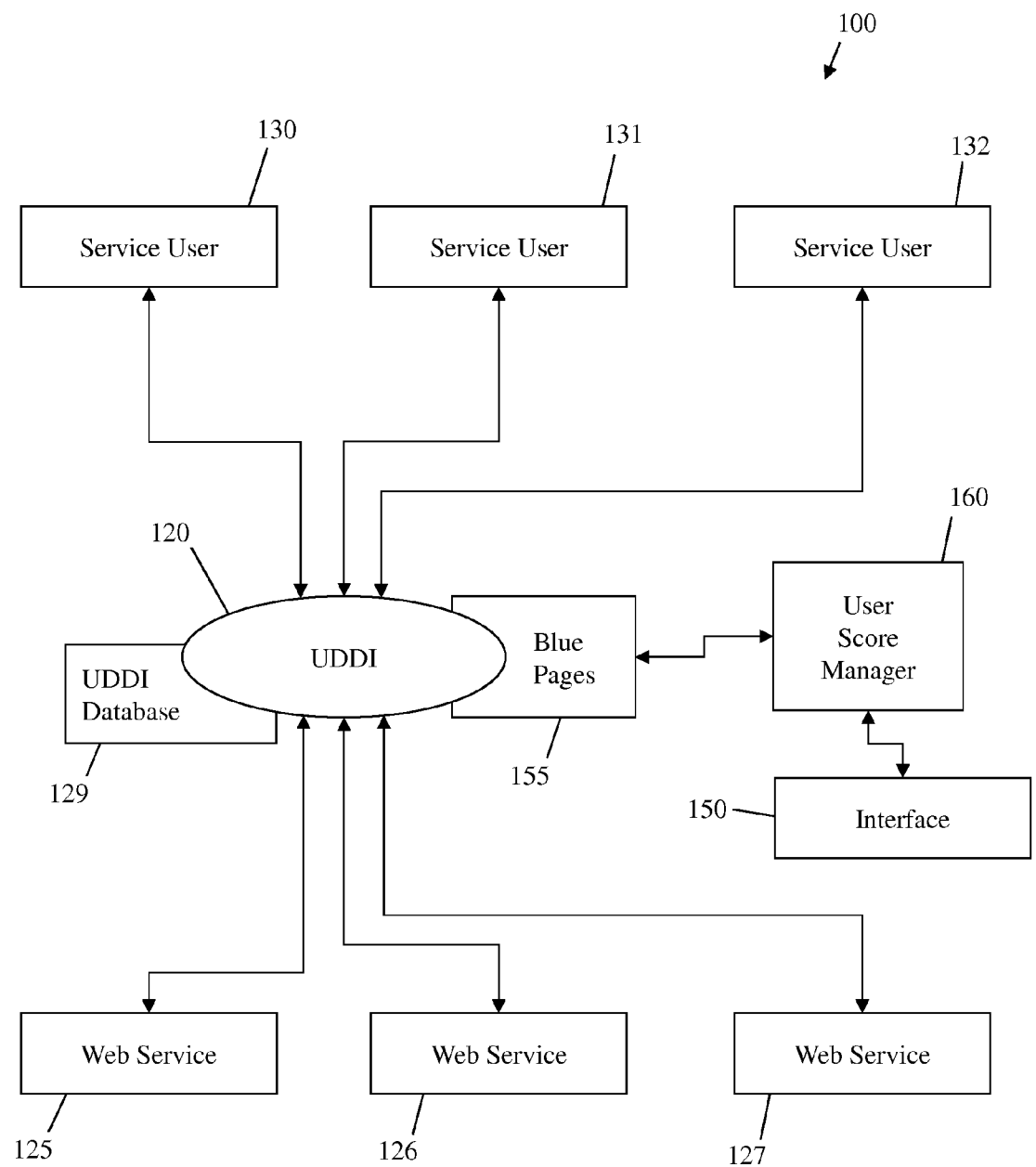
FIG. 2 shows an exemplary web services environment according to aspects of the invention.

FIG. 2 shows a web services environment 100, such as, for example, a UDDI environment. FIG. 2 can be implemented in the environment of FIG. 1. The web services environment 100 may comprise a UDDI server 120 that contains a registry of information pertaining to available (e.g., published) web services 125, 126, 127. For example, the UDDI server 120 may comprise a database 129 including typical white pages, yellow pages, and green pages data entries that contain information about each web service 125, 126, 127. Users 130, 131, 132 may access the UDDI server 120 to find information about the web services 125, 126, 127. For example, a user may search the UDDI database 129 in a known manner using any suitable combination of search parameters. The search may result in a list of services that meet the search criteria and are displayed to the user for evaluation. In this manner, the user may locate and execute a web service.

The UDDI server 120 may comprise any suitable article of computing that is capable of maintaining or accessing information about the web services 125, 126, 127, and that is also capable of allowing users 130, 131, 132 to access that information. The web services 125, 126, 127 may be any type of suitable service, and can be physically located (i.e., stored) at the UDDI server 120 or at network (e.g., intranet and/or Internet) locations that are accessible by the UDDI server 120 and users 130, 131, 132. The users 130, 131, 132 may comprise an article of computing in communication with at least the UDDI server 120, and may further comprise a graphical user interface that allows a human operator to selectively communicate with at least the UDDI server 120. Moreover, any suitable type of network connection(s) may be employed for passing information between any number of users, the UDDI server 120, and any number of web services.

Still referring to FIG. 2, in implementations of the invention, an interface 150 is provided. For example, the interface 150 may be a graphical user interface (e.g., a web site) displayed on a computing device that allows a user to register as a user of the web services environment, make comments about web services, and rate the value of comments made by other users. The interface 150 may be separate from, or integrated with, an already existing user interface for accessing the UDDI server in the web services environment. For example, a single interface 150 may allow a user to perform actions, such as, for example, registering as a user of the web services environment, updating user registration information, searching the UDDI for web services, making comments about web services, and rating the helpfulness of other user comments.

In embodiments, information entered by a user through the interface 150 is stored in a database 155. The database 155 may be linked to, part of, or an extension of a conventional UDDI database 129. For example, in implementations of the invention, information entered by a user through the interface 150 is stored in a database extension of a conventional UDDI system, the database extension being referred to herein as the "blue pages". The information stored in the blue pages may include, for example, user name, user contact information, and/or user comments on web services, etc. In embodiments, the database 155 is located at the UDDI server 120, although other physical locations on the web services environment network may be used.

Additionally, a user score manager (USM) 160 may be provided. In embodiments, the USM 160 interacts with the interface 150 and database 155 to determine an influence rating for each registered user (or, at least those users that have provided comments about web services). The USM 160 may comprise software and/or hardware that is configured to transmit data to and from the interface 150 and database 155 and determine user influence ratings based upon such data. For example, the USM 160 may comprise a software program that is stored and executed on the UDDI server 120. Alternatively, the USM 160 may be located at any suitable location on a network of a web services environment.

As described herein, the interface 150, database 155, and USM 160 allow users to register with the web services environment and to provide comments on web services that are available through the web services environment. As such, a user may provide comments on a web service, and these comments may be displayed to other users reviewing the particular web service. For example, according to aspects of the invention, the information stored in the database 155 (i.e., blue pages) is linked to the UDDI database 129 by an index associated with both the database 155 and the UDDI database 129. In this manner, search results showing web services that meet search criteria, as described above with respect to UDDI systems, may also show information from the database 155, such as, for example, user comments associated with a particular web service, a user name associated with a comment, and a user influence rating associated with the user name.

Influence Rating

An additional data field in the database 155 (e.g., blue pages) may comprise an influence rating associated with a particular user. The influence rating for a particular user is based upon other users' subjective valuations of the particular user's comments with respect to web services, and may be determined in any suitable manner based upon the feedback provided by other users. For example, assume that User A has provided comments about Service X. When User B searches the UDDI database 129 for services and comes across Service X, the comments of User A will be displayed to User B to assist User B in making an informed decision about using Service X. User B may rate the value of User A's comments by providing feedback of User A's comments through the interface 150. In embodiments, the USM 160 determines an influence rating for User A based upon all such feedback from all other users regarding User A's comments.

Figure 3:
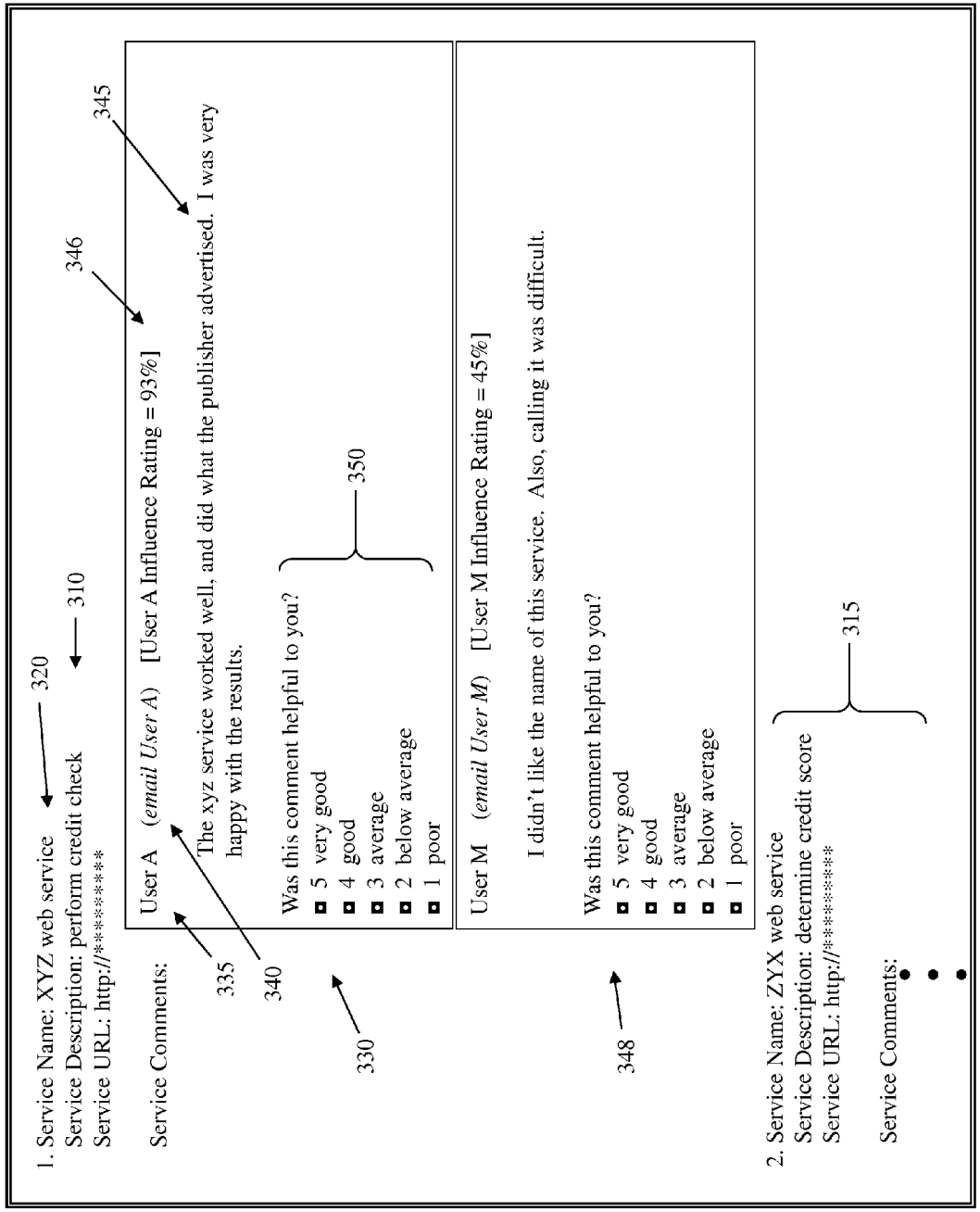
FIG. 3 shows an exemplary interface according to aspects of the invention.

For example, FIG. 3 shows an exemplary search result of a UDDI registry. The search result may be displayed, for example, by the interface 150. The search result includes a first service listing 310 and a second service listing 315. Displayed with each service listing 310, 315 is conventional UDDI information 320, such as, for example, the service name, the service description provided by the service publisher, and the service location (i.e., URL), etc.

Also shown associated with the first service listing 310 are comments provided by various users. For example, a first comment 330 includes the name 335 and contact information 340 of the user that made the comment, text of the comment 345, and the influence rating 346 of the user that authored the comment (described in greater detail below). In embodiments, all of this information is retrieved from the database 155 and transmitted to a user as the result of a search query by the user. A second comment 348, made by a different user, shows similar information. Although two comments are shown, any suitable number of comments may be associated with and displayed with a particular service.

As further seen in FIG. 3, the first comment 330 includes a feedback portion 350 that allows other users to rate the comment. The feedback portion 350 includes a number between one and five that can be selected (for example by positioning and clicking a mouse pointer) to rate the perceived value of the comment. Although a scale of one to five is shown, it is understood that any feedback valuation scheme could be used within the scope of the invention.

In embodiments, any user viewing the first comment 330 may rate the comment using the feedback portion 350. The USM 160 receives the feedback score from the interface 150, and determines a user influence rating for the owner of the comment. For example, the USM 160 may average all of the feedback scores for the comment to determine the user influence rating for the user that made the comment. Even more specifically, upon the receipt of a feedback value from the interface, the USM 160 may: obtain the current influence rating for the user from the database 155; determine an updated influence rating based upon the current influence rating and the feedback; and/or store the updated influence rating in the database 155. Moreover, if a particular user has made plural comments associated with plural web services, the USM 160 may average all of the feedback scores from all of the comments by the particular user to determine the influence rating of the particular user. It is noted that although averaging has been described, any suitable numerical method may be used to determine the influence rating.

In implementations, the influence rating for a user is stored in the database 155 (e.g., blue pages) each time that the user influence rating is determined by the USM 160. Thus, the database 155 may comprise, for each user: a database entry (e.g., data field) pertaining to the user name; a database entry pertaining to the user contact information; a database entry pertaining to the user influence rating; and/or a separate database entry for each comment associated with a service. In this way, when the UDDI server 120 access the UDDI database 129 (e.g., the white, yellow, or green pages) for information associated with a particular service, the UDDI server 120 may also access the database 155 (e.g., the blue pages) to retrieve and display user comment information associated with the particular service. The user comment information may include, for each user that made a comment regarding the particular service: the name of the user that made the comment; the contact information of the user that made the comment; the text of the comment; and/or the influence rating of the user that made the comment. Accordingly, another user reviewing all of this information is provided with enhanced information for evaluating the web service(s) listed as returned from a UDDI search.

In further implementations, some or all of the data contained in the blue pages may be used as search parameters in a UDDI search. For example, in addition to searching using parameters from the white pages, yellow pages, and/or green pages, a user may also be able to search based upon at least one of: comment text, user influence rating, and user name. In this manner, the searching of the published services may be enhanced.

Processes of the Invention

The steps of the flow diagrams described herein may be implemented in the environment of FIG. 1. The flow diagrams may equally represent a high-level block diagram of the invention. The steps of the flow diagrams may be implemented and executed from a server, in a client-server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 4:
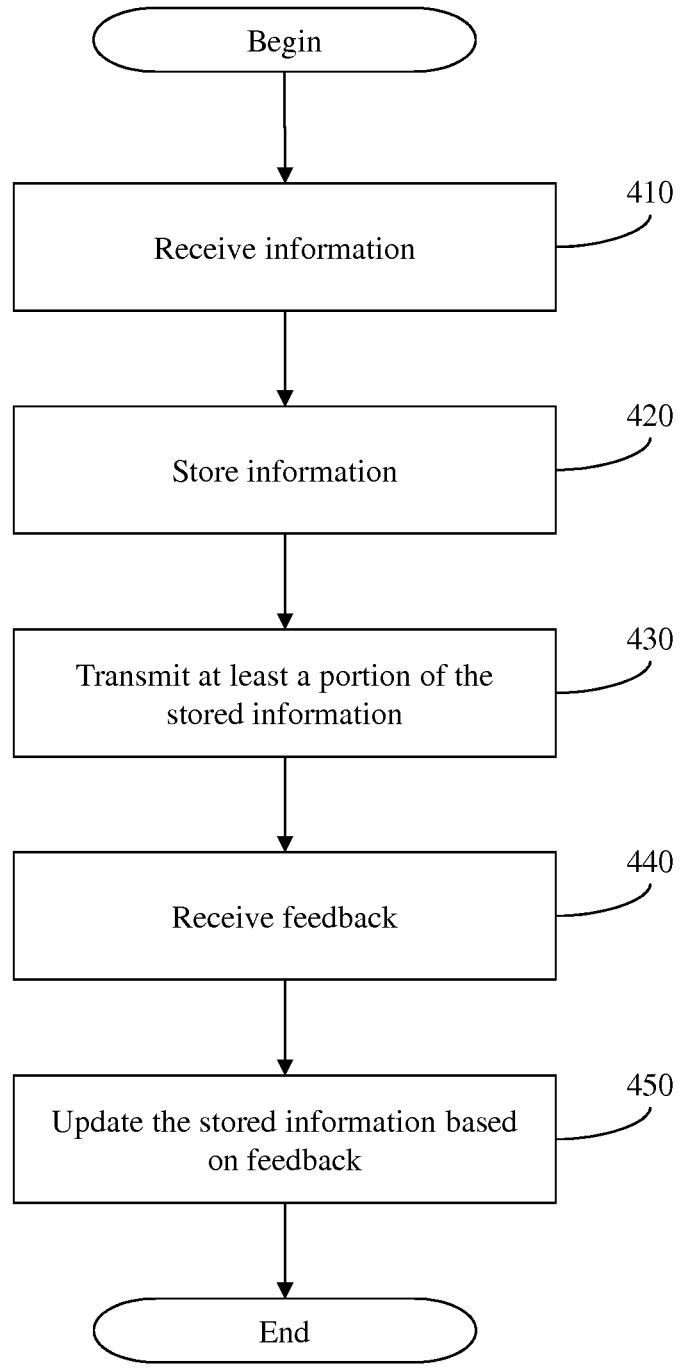
FIGS. 4 and 5 show flow diagrams depicting implementations of methods according to aspects of the invention.

FIG. 4 shows a flow diagram depicting steps of a first method for managing user ratings according to aspects of the invention. At step 410, information from a user is received. In embodiments, this comprises receiving information from the user via an interface, such as interface 150 described above. The information may comprise at least one of: a user name, user contact information, and a comment about a service. It is noted that the invention is not limited to this specific information, and other types of information may be received in step 410. The information may be received by a user score manager and/or UDDI server, such as those described above. The information may be received via communication on a network connecting the interface and user score manager and/or UDDI server.

At step 420, the information received in step 410 is stored. In embodiments, the information is stored in a database, such as database 155 described above. Moreover, the database the information is stored in may be part of, an extension of, or linked to a UDDI database. As an example, the information may include user name, user contact information, and comments about a service, and the storage may comprise saving any of these to respective data fields in the database. Alternatively, the information may simply be an update or modification of already existing information in the database. For example, a user may modify an already existing comment about a service, in which case step 410 comprises storing new (e.g., modified) information in the place of old (e.g., existing) information in the database.

At step 430, at least a portion of the information received in 410 and stored in step 420 is transmitted to a user. This may be accomplished, for example, by transmitting the information to an interface via a network. In embodiments, the information that is transmitted comprises information determined as the result of a search query of a UDDI registry, such as conventional UDDI information pertaining to available services. Additionally, the information transmitted comprises a comment by a user, and an influence rating of the user that made the comment. That is, the information transmitted at step 430 may include UDDI information about a web service, a comment by a user about the web service, and an influence rating of the user that made the comment.

Still referring to FIG. 4, feedback is received from a user at step 440. For example, the user that the information was transmitted to in step 430 may provide feedback about a comment the user viewed. In embodiments, the feedback may comprise a numerical score representative of the user's subjective valuation of a comment associated with a web service.

At step 450, data in the database is updated. In embodiments, this comprises determining an updated influence rating for the user that feedback was received for at step 440. The updated influence rating may be determined, for example, with a user score manager, such as that described above. In implementations, the updated influence rating of the user is then stored in the database with the other information related to that user such that it can be retrieved in the future and transmitted to other users.

It is noted that the invention is not limited to the serial sequence of steps depicted in FIG. 4; rather, implementations of the invention additionally provide for parallel interaction of multiple users with the system. That is, different users may cause the various steps of FIG. 4 to happen at substantially the same time. For example, a first user may register with the system for a first time, or update his/her already existing registration information, thereby causing steps 410 and 420 to be performed. At substantially the same time, or during an overlapping time period, a second user may identify himself to the system, identify a service to the system, and create or edit a comment regarding the service, thereby causing steps 410 and 420 to be performed. Moreover, at substantially the same time, or during an overlapping time period, a third user may receive and review service information (including a comment) and provide feedback on the comment, thereby causing steps 430, 440, and 450 to be performed. In this manner, various sub-processes of the overall process shown in FIG. 4 may be performed in parallel.

Figure 5:
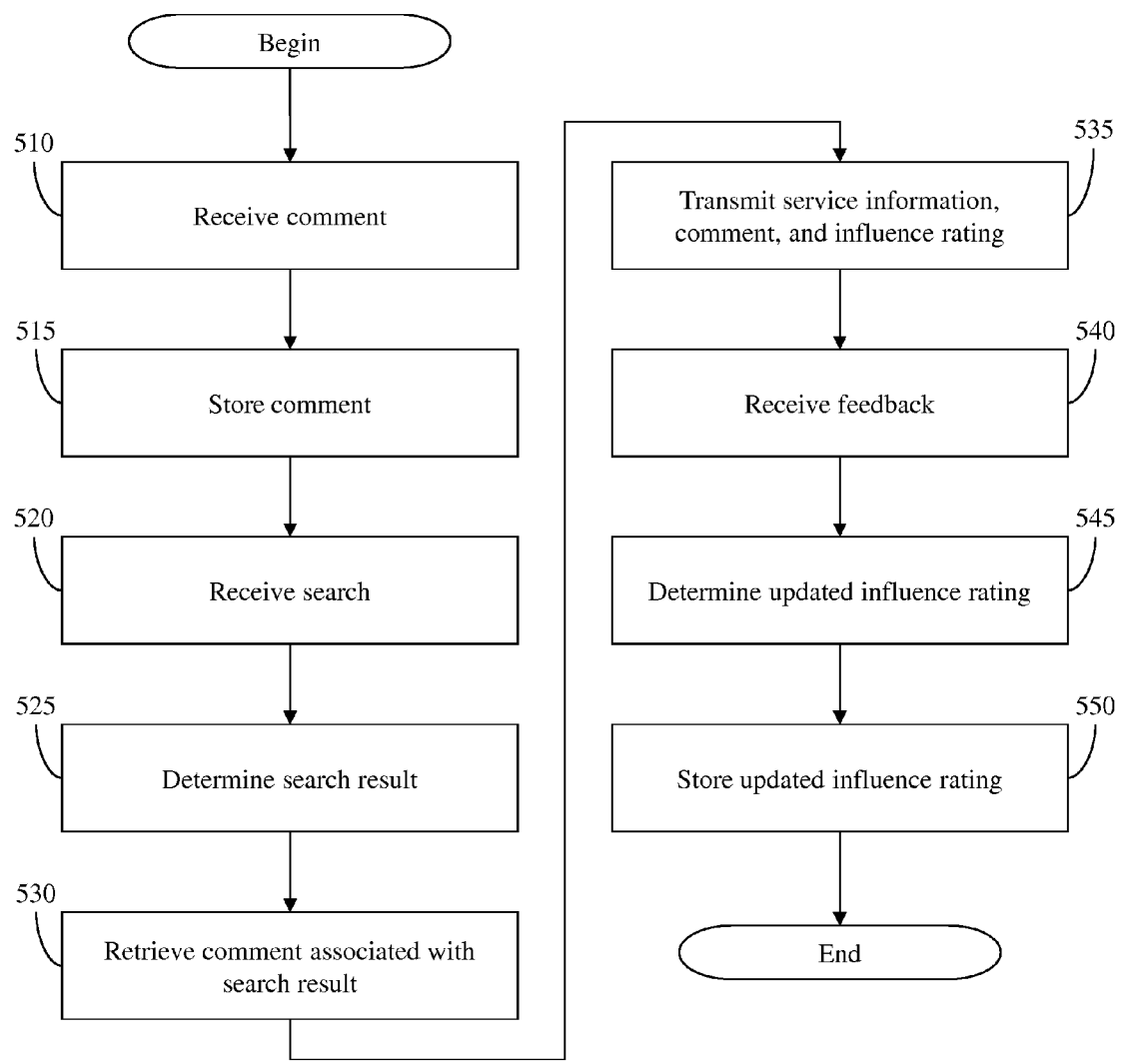

FIG. 5 shows a flow diagram depicting steps of a second method for managing user ratings according to aspects of the invention. At step 510, a comment regarding a web service is received from a first user. In embodiments, this may be performed similarly to step 410, described above. For example, a first user in a web services environment may make a comment about a particular web service available in that environment.

At step 515, the comment from step 510 is stored. In embodiments, the comment is stored in a database, although any suitable storage method may be used with the invention. More specifically, the comments may be stored in a database that is part of, or an extension of, a UDDI database.

At step 520, a search query is received. For example, a second user may perform a search of a UDDI registry using various search parameters. The search may be performed using a web services environment interface (such as a website), and may be transmitted over a network.

At step 525, a search result is generated in response to the search query. For example, a UDDI server may generate a result list comprising at least one web service that meets the criteria of the search query.

Still referring to FIG. 5, comments, if any exist, for each web service included in the result list are retrieved from the database at step 530. In embodiments, this comprises retrieving at least comment text and user influence rating associated with each comment of each service of the result list. More specifically, the comments retrieved may comprise the comment from the first user that was received in step 510 and stored in step 515. Moreover, the influence rating of the first user may be retrieved from the database. In implementations, the retrieval of the influence rating of the first user is performed by a user score manager, such as that described above.

At step 535, conventional UDDI data and the retrieved comments for each web service of the result list are transmitted to the second user from which the search was received at step 520. The influence rating of a user associated with any transmitted comment may also be transmitted. For example, the transmission may be made over a network to a web services environment interface. In embodiments, upon transmission of data in step 535, the second user is presented with web service information, comment text, and user influence rating At step 540, feedback is received from the second user. In embodiments, the second user may review the comment text of the first user associated with a web service. The second user may provide feedback by, for example, selecting a number along a pre-defined scale of valuation of the comment. In implementations, the feedback (e.g., numerical value) is transmitted to the user score manager that retrieved the influence rating at step 530.

Still referring to FIG. 5, an updated influence rating of the first user is determined at step 545. In embodiments, the user score manager updates the influence rating of the first user based upon the current influence rating and the feedback received in step 540. For example, the user score manager may perform a numerical operation (such as weighted averaging) based upon both the current influence rating and the feedback, thereby resulting in an updated influence rating of the first user.

At step 550, the updated influence rating of the first user is stored in the database. In embodiments, the updated influence rating replaces the previous influence rating of the first user. In this manner, each time feedback is received for any comment made by the first user, the influence rating of the first user is updated. The management of user comments and influence rating, as described herein, allows such comments and influence rating to be presented to future users as a tool for use in determining whether or not to use a particular web service in a web service environment.

Similar to FIG. 4 described above, embodiments of the invention are not limited to serial execution of steps 510-550 of FIG. 5; rather, various sub-processes of the overall process may occur in a parallel fashion. For example, a first user may identify himself to the system, identify a service to the system, and create or edit a comment regarding the service, thereby causing steps 510 and 515 to be performed. At substantially the same time, or during an overlapping time period, a second user may perform a search and receive search results, thereby causing steps 520-535 to be performed. Moreover, a third user may provide feedback about a comment, thereby causing steps 540-550 to be performed. In this manner, multiple users may interact with the system substantially simultaneously to effectuate various sub-processes of the overall process shown in FIG. 5 in parallel.

While the invention has been described in terms of embodiments, those skilled in the art will recognize that the invention can be practiced with modifications and in the spirit and scope of the appended claims. For example, while the embodiments have been described with respect to a single user's influence rating, it is noted that multiple users each may have an associated influence rating.

What is claimed is:

1. A computer program product comprising a tangible computer usable storage memory or device having a computer readable program embodied in the tangible computer usable storage memory or device, wherein the computer readable program when executed on a computing device is operable such that the computing device:

provides a service oriented architecture comprising a first database and a second database of a Universal Description, Discovery, and Integration (UDDI) registry, wherein the first database is linked to the second database, and the second database of the UDDI registry comprises data entries that include information about web services;

stores a user comment concerning at least one web service of the web services in the first database;

determines an influence rating associated with an author of the user comment, wherein the influence rating is determined by a user score manager (USM) that interacts with the first database and an interface, and the USM is stored and executed on the UDDI registry;

stores in the first database the influence rating associated with the author of the user comment;

receives a search query from a user for information about the at least one web service of the web services;

retrieves the information, the user comment, and the influence rating associated with the at least one web service of the web services;

receives feedback from the user regarding the user comment; and determines an updated influence rating based upon the feedback and the influence rating.

2. The computer program product of claim 1, wherein the data entries of the UDDI registry are from at least one of white pages, yellow pages, and green pages of the UDDI registry, and wherein the influence rating is stored in blue pages of the first database.

3. The computer program product of claim 1, wherein the second database further comprises execution instructions of the web service.

4. The computer program product of claim 1, further comprising storing the updated influence rating.

5. The computer program product of claim 1, wherein the receiving the feedback comprises receiving feedback data from the interface over a network.

6. The computer program product of claim 5, wherein the feedback data comprises a score selected by the user.

7. The computer program product of claim 1, wherein the receiving the search query further comprises receiving the search query for published web services in the UDDI registry.

8. The computer program product of claim 7, further comprising transmitting the information, the comment, and the influence rating to the user based upon the search query.

9. The computer program product of claim 7, wherein the information associated with the web service is a result of the search query.

10. The computer program product of claim 1, wherein the information about the web services comprises at least one of: identity information of a publisher of the web services, network location of the web services, and execution instructions of the web services.

11. A computing system, comprising a hardware computer infrastructure operable to:
provide a service oriented architecture comprising a first database and a second database of a Universal Description, Discovery, and Integration (UDDI) registry, wherein the first database is linked to the second database, and the second database of the UDDI registry comprises data entries that include information about offered web services;
store at least one user comment concerning at least one web service of the web services in the first database;
determine an influence rating associated with an author of the at least one user comment, wherein the influence rating is determined by a user score manager (USM) that interacts with the first database and an interface, and the USM is stored and executed on the UDDI registry;
store the influence rating of the author of the at least one comment in the first database;
receive a search query from a user for information about the at least one web service of the offered web services;
retrieve the information, the at least one user comment, and the influence rating associated with the at least one web service of the web services;
receive feedback from the user regarding the at least one user comment; and
update the influence rating based upon the feedback.

12. The system of claim 11, wherein the data entries of the UDDI registry are from at least one of white pages, yellow pages, and green pages of the UDDI registry and wherein the influence rating is stored in blue pages of the first database.

13. The system of claim 11, wherein at least one of the storing the at least one comment, the determining the influence rating, the storing the influence rating, the receiving the feedback, and the updating the influence rating are provided by a service provider under a subscription and/or fee agreement and/or based on advertising content to one or more third parties.

14. The system of claim 11, wherein the information associated with the at least one web service comprises at least one of: identity information of a publisher of the at least one web service, network location of the at least one web service, and execution instructions of the at least one web service.

* * * * *